AUTOMATIC GAIN CONTROL CIRCUIT-ARRANGEMENT USED IN TELEVISION RECEIVER

Filed Feb. 5, 1954

INVENTOR
PETER JOHANNES HUBERTUS JANSSEN

BY [signature]

AGENT

United States Patent Office 2,846,501

Patented Aug. 5, 1958

2,846,501

AUTOMATIC GAIN CONTROL CIRCUIT-ARRANGEMENT USED IN TELEVISION RECEIVER

Peter Johannes Hubertus Janssen, Eindhoven, Netherlands, assignor, by mesne assignments, to North American Philips Company, Inc., New York, N. Y., a corporation of Delaware Application February 5, 1954, Serial No. 408,541

Claims priority, application Belgium February 24, 1953

3 Claims. (Cl. 178—7.3)

The invention relates to a circuit arrangement for use in a television receiver for producing a control-voltage for automatic gain control with the aid of a discharge tube, to one control-electrode of which is supplied the detected signal and to a further control-electrode is supplied another signal such that the tube can draw current only during time intervals in which the detected signal contains or exceeds a reference level.

In known circuits of this kind the detected signal, for example, is supplied to the control-grid of a discharge tube and the other signal, which is a pulsatory keying signal, is supplied as the anode voltage to this tube, so the keying anode current can flow only during that signal.

The value of this anode current is determined by the actual amplitude of the detected signal at the control-grid.

The pulsatory signal at the anode is, in this case, in general the pulsatory signal initiating from the line deflection circuit.

Such an arrangement has a limitation in that phase shift may occur between the reference levels in the frame signal and the fly-back pulses of the line deflection circuit, if an automatic frequency-control circuit is employed for the frequency-control of the line deflection.

Therefore, instead of using the pulses from the line sawtooth circuit, use is preferably made of pulses derived directly from the incoming synchronizing pulses themselves. Since it is difficult to use these derived pulses as a source of anode voltage for the tube, they are supplied to a further control-electrode of the tube.

If the anode voltage supply of the television receiver is then used also for feeding the anode of this tube, it is inconvenient that the control-voltage obtained across the output circuit of the tube has a wrong voltage level. In order to obviate this disadvantage, use must be made of additional voltage sources, the voltages of which deviate frequently from those required otherwise in the receiver.

The circuit arrangement according to the invention obviates this disadvantage and is characterized in that the anode voltage is derived from a rectifying circuit for the voltage pulses derived from a sawtooth generator of the receiver, the control-voltage for automatic gain control being derived from a resistor included in the rectifying circuit.

Figure 1:
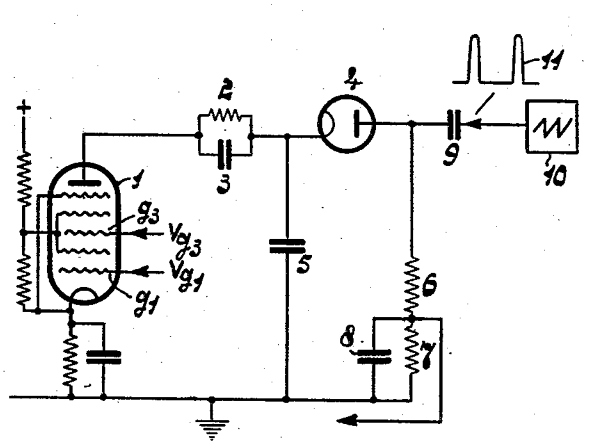

In order that the invention may be readily carried into effect, it will now be described with reference to the accompanying drawing, in which:

Fig. 1 shows one embodiment of the circuit arrangement according to the invention, the operation of which will be explained with reference to Fig. 2 for positive modulation and with reference to Fig. 3 for negative modulation, these figures showing the grid voltages supplied as functions of time.

The circuit shown in Fig. 1 comprises a heptode tube 1 having a first control-grid $g_1$ and a second control-grid $g_3$.

The anode of the tube 1 is connected through the parallel combination of a resistor 2 and a capacitor 3 to the cathode of a rectifier 4. Between this cathode and earth provision is made of a capacitor 5. The anode of the diode is connected to earth via the resistors 6 and 7 and a capacitor 8 is connected in parallel with the resistor 7.

The anode of the diode is furthermore connected through a capacitor 9 to an output circuit of the line deflection circuit 10, the arrangement of which is known and from which pulses 11 are derived in known manner.

An RC-network is connected between the cathode of the tube 1 and earth and via a potentiometer from which also the screen-grid bias voltages for the tube 1 are derived, the cathode is connected to the voltage source.

Thus a negative bias voltage for the control-grids $g_1$ and $g_3$ is obtained in known manner (not shown).

Figure 2:
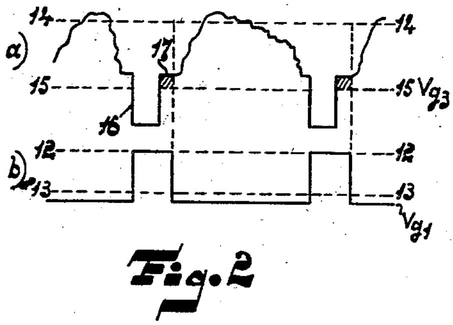

A voltage $V_{g1}$, as indicated in Fig. 2^b or 3^b, is supplied to the control-grid $g_1$. This pulsatory voltage has an amplitude such that the cathode potential indicated by the broken line 12 is just obtained and in the time interval between the pulses the voltage at the grid $g_1$ lies below the cutting-off point, indicated by the broken line 13.

Figure 3:
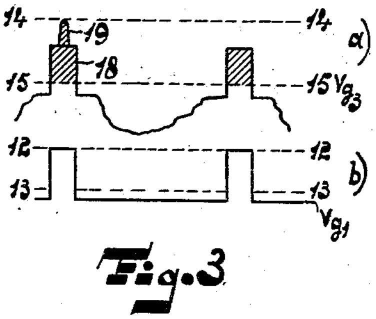

The detected frame signal, indicated in Fig. 2^a for positive modulation and in Fig. 3^b for negative modulation, is supplied to the control-grid $g_3$. The broken line 14 indicates the potential corresponding to the cathode potential and the broken line 15 indicates the cutting-off point of the grid $g_3$.

The pulsatory voltage at the grid $g_1$ is derived in known manner from the incoming synchronizing signal itself, and the duration of these derived pulses, in the case of positive modulation shown in Fig. 2, is longer than the incoming synchronizing signals 16, shown in Fig. 2^a. From Fig. 2^a it is evident that during the synchronizing signals 16 the tube is cut off, since the voltage at the grid $g_3$ then remains below the cutting-off point 15. Thus current can flow in the tube 1 to the anode only during the back porch 17 of the blanking of the detected signal.

At the reception of a signal modulated in negative sense on a carrier wave, it is supplied with opposite polarity to the grid $g_3$, as is indicated in Fig. 3^a. The duration of the pulses at the grid $g_1$ need not be longer than that of the pulses 18. As is known and evident from Fig. 3, the tube 1 can be traversed by anode current only during the synchronizing pulses.

Since both in the case shown in Fig. 2 and in that shown in Fig. 3 the amplitude of the pulses at the grid $g_1$ is constant, the value of the anode current in the tube is determined by the voltage difference between the back porch 17 of the blanking and the level 15 or between the peaks of the synchronizing pulses and the level 15, if any interference pulses 19, to be described more fully hereinafter, occurring in the case of negative modulation, are left out of consideration.

If the said voltage differences increase, which occurs if the amplitude of the incoming signal increases, the anode current also increases.

If the anode voltage of the tube 1 is derived via a resistor from the anode supply voltage source of the receiver, the anode voltage of the tube 1 drops at an increase in amplitude of the incoming signal, so that the anode voltage of the tube 1 will indeed vary in the sense desired for automatic gain control. However, the anode supply voltage is comparatively high and positive, so that it is not suitable for supply to control-grids of high-frequency- and intermediate-frequency amplifiers of the receiver.

In the circuit arrangement shown in Fig. 1 the pulsatory voltage 11 is rectified with the aid of the diode 4, a positive voltage occurring at the cathode of this diode. At the reception of signals modulated in positive sense on a carrier wave this voltage may be supplied directly to the anode of the tube 1, but in the case of negative modulation it is supplied preferably via the parallel combination of the resistor 2 and the capacitor 3. If anode current traverses the tube 1, charge is withdrawn from the capacitor 5; this decrease in charge is periodically restored, resulting in current corresponding to the decrease in charge flowing through resistors 6 and 7, the junction of resistors 6 and 7 being at negative potential with respect to earth. The voltage across the resistor 7 is smoothed with the aid of capacitor 8 and used as a control-voltage for automatic gain control, the amplitude being controllable by varying the value of the resistor 7 or of the potentiometer ratio of resistors 6 and 7.

Thus a suitable control-voltage is obtained in a simple manner.

At the reception of television signals modulated in negative sense on a carrier wave, an interference pulse produces an increase in amplitude, so that, as is evident from Fig. 3[a], such a pulse, indicated at 19, contributes to the anode current in tube 1, if it occurs during the time of the synchronizing pulse 18.

In order to suppress this interference, the parallel combination 2, 3 is included in the anode circuit.

If only a very short pulse 19 occurs, it contributes little to the anode current, but a long interference pulse would contribute to a considerably greater extent, if no measures were taken.

At the occurrence of long interference, the anode voltage of the tube 1 drops below the knee of the anode-current-anode voltage characteristic curve of the screen-grid tube owing to the presence of the network 2, 3 so that the anode current in the tube is materially decreased and the effect of the interference is reduced.

For the sake of completeness it should be noted that instead of using the rectifier 4, use may, for example, be made of a voltage-dependent resistor. Since an alternating voltage is supplied through the capacitor 9 to the rectifying resistor, the latter has a low value during the voltage pulses, whereas during the time intervals, when a negative voltage of low amplitude is supplied, the value of the voltage-dependent resistor is high, so that an asymmetrically conductive arrangement is obtained.

What is claimed is:

1. An automatic gain control circuit comprising a source of detected signals periodically containing a reference level, a source of pulses synchronized with said signals to produce synchronizing pulses occurring during the periodic occurrences of said reference level, a pulse generator, an electron discharge tube containing two control grids, a cathode and an anode, means connected to apply said detected signals to one of said control grids with a polarity and amplitude to enable said tube to be conductive during the occurrence of said reference level, means connected to apply said synchronizing pulses to the remaining one of said control grids with a polarity of amplitude to enable said tube to be made conductive only during the occurrences of said synchronizing pulses, a rectifying circuit containing a rectifier member connected between said pulse generator and said anode and a capacitor connected between said anode and said cathode to apply a rectified operating voltage to said anode, a resistor connected between said cathode and said rectifier member on the pulse generator side thereof, and an electrical connection connected to said resistor to receive an automatic gain control voltage from said resistor.

2. A circuit arrangement as claimed in claim 1, including a resistor and a capacitor connected in parallel combination, said combination being connected between said rectifying circuit and said anode.

3. An automatic gain control circuit comprising a source of detected signals periodically containing a reference level, a source of pulses synchronized with said signals to produce synchronizing pulses occurring during the periodic occurrences of said reference level, a pulse generator, an electron discharge tube containing two control grids, an anode and a cathode, means connecting said cathode to electrical ground, means connected to apply said detected signals to one of said control grids with a polarity and amplitude to enable said tube to be conductive during the occurences of said reference level, means connected to apply said synchronizing pulses to the other of said control grids to enable said tube to be made conductive only during the occurrences of said synchronizing pulses, a rectifier having a cathode and an anode, means connecting said last-named anode to said pulse generator, means connecting said last-named cathode to the anode of said tube, a capacitor connected between said last-named cathode and electrical ground, a resistor connected between said last-named anode and electrical ground, and an electrical connection connected to said resistor to receive therefrom an automatic gain control voltage.

References Cited in the file of this patent

UNITED STATES PATENTS

| | | |
|---|---|---|
| 2,158,261 | Urtel et al. | May 16, 1939 |
| 2,227,056 | Blumlein et al. | Dec. 31, 1940 |
| 2,632,802 | Vilkomerson et al. | Mar. 24, 1953 |
| 2,654,799 | Wendt | Oct. 6, 1953 |